(12) United States Patent
Yiu

(10) Patent No.: US 7,187,135 B2
(45) Date of Patent: Mar. 6, 2007

(54) HIGH INTENSITY DISCHARGE LAMP ELECTRONICS CONTROLLER

(76) Inventor: Newman Lau Man Yiu, 17th Floor, Room 1710, Regent Center, Tower A, 63 Wo Yi Hop Road, Kwai Chung (HK)

( * ) Notice: Subject to any disclaimer, the term of this patent is extended or adjusted under 35 U.S.C. 154(b) by 0 days.

(21) Appl. No.: 11/055,223

(22) Filed: Feb. 10, 2005

(65) Prior Publication Data

US 2005/0179402 A1 Aug. 18, 2005

(30) Foreign Application Priority Data

Feb. 11, 2004 (CN) .................. 2004 2 0154618

(51) Int. Cl.
*H05B 37/00* (2006.01)

(52) U.S. Cl. ................ 315/219; 315/244; 315/307
(58) Field of Classification Search ............. 315/244, 315/219

See application file for complete search history.

(56) References Cited

U.S. PATENT DOCUMENTS 6,020,691 A * 2/2000 Sun et al. ............ 315/307
6,181,076 B1 * 1/2001 Trestman et al. ....... 315/224

* cited by examiner

*Primary Examiner*—David Vu
(74) *Attorney, Agent, or Firm*—Merchant & Gould

(57) ABSTRACT

A high intensity discharge (HID) lamp electronics controller including a reverse protection circuit and a control protection module. The control protection module includes an under/over voltage protection circuit and an open-circuit and short-circuit protection circuit.

6 Claims, 2 Drawing Sheets

HIGH INTENSITY DISCHARGE LAMP ELECTRONICS CONTROLLER

FIELD OF THE INVENTION

The present invention relates to a high intensity discharge lamp electronics controller. More particularly, the present invention relates to the high intensity discharge lamp electronics controller with a 12V or 24V direct current supply.

BACKGROUND OF THE INVENTION

High intensity discharge (HID) lamp electronics controllers have applications in many fields, especially in the field of automobile illumination. HID lamp electronics controllers can effectively reduce traffic accidents. The existing low-voltage HID electronics controllers have many problems such as complex installation and usage, too many subassemblies, and too few use functions and protection functions. Moreover, the existing low-voltage HID electronics controllers are bulky, unreliable, and unsafe. There are further disadvantages regarding the existing low-voltage HID electronics controllers. In particular, the existing HID electronics controllers will burn if either the anode or the cathode of a battery is connected incorrectly. Another disadvantage of the existing low-voltage HID electronics controllers is that if a user turns off the engine of an automobile but forgets to turn off the lamp of the HID electronics controller, then the battery of the automobile will not have enough voltage for starting the engine at a later time. Moreover, when an automobile is started, the electric voltage in the automobile increases to around 23 KV. If a HID electronics controller in the automobile is broken or contains no bulb, then when the automobile is started and the electric voltage increases, the controller may spark and cause a fire within the automobile. Also, the performance of the bulb of an existing HID electronics controller may be inconsistent in performance as the bulb ages or is a replaced with bulbs of different brands.

SUMMARY OF THE INVENTION

Stated in general terms, the present invention comprises an improved HID lamp electronics controller that is easy to install, safe to use, and reliable.

In an embodiment of the present invention, the HID lamp electronics controller includes a direct current power supply, a step-up transformer connected to the direct current power supply, an AC converter, and a capacitive-discharge ignition (CDI) system having an output that connects to a HID lamp. A reverse protection circuit is included between the direct current supply and the step-up transformer.

The HID lamp electronics controller includes a control protection module that consists of a switch tube, a pulse-width modulator, and an under/over voltage protection circuit. The switch tube includes a control end that connects to an output of the pulse-width modulator, and the switch tube connects to a primary coil of the step-up transformer. The under/over voltage protection circuit samples the direct current supply and outputs to the pulse-width modulator.

The control protection module further includes an open-circuit and short-circuit protection circuit having an output that connects to an input of the pulse-width modulator. The open-circuit and short-circuit protection circuit also includes an input that connects to an output of the step-up transformer. The open-circuit and short-circuit protection circuit also samples the voltage from the output of the step-up transformer. Moreover, the control protection module includes a ballast-track electric circuit having an output that connects to the input of the pulse-width modulator. The ballast-track electric circuit samples the voltage from the output of the step-up transformer and the current from the AC converter.

In an embodiment of the present invention, the HID lamp electronics controller includes a first filtering network between the direct current supply and the step-up transformer and a second filtering network between the AC converter and CDI system. A power supply instruction circuit connects to an output of the direct current supply.

DETAILED DESCRIPTION OF THE PREFERRED EMBODIMENT

Figure 1:
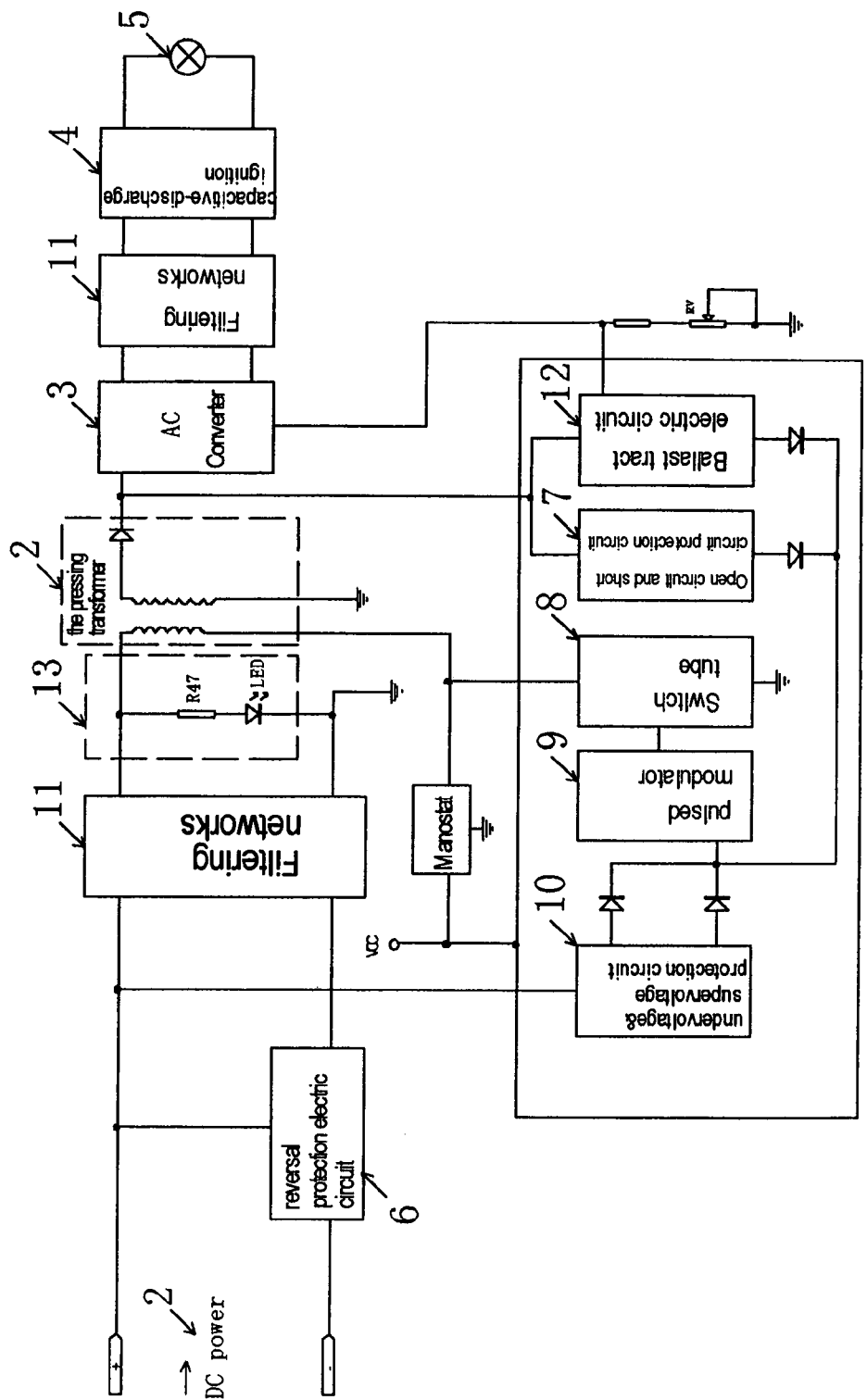
FIG. 1 is a flow of work instruction diagram of the HID lamp electronics controller according to a preferred embodiment of the present invention.

Referring now to the drawings in which like numerals represent like elements through the several figures, FIG. 1 is a flow of work instruction diagram illustrating the HID lamp electronics controller 20 of the present invention. As illustrated in FIG. 1, the HID lamp electronics controller 20 includes a direct current supply 1, a step-up transformer 2 connected to the direct current power supply, an A/C converter 3, and a capacitive-discharge ignition (CDI) system 4 having an output that connects to a HID lamp 5. A reverse protection circuit 6 is positioned between the direct current supply 1 and the step-up transformer 2.

In an embodiment of the present invention, the HID lamp electronics controller 20 further includes a control protection module 14 that consists of a switch tube 8, a pulse-width modulator 9 and an under/over voltage protection circuit 10. The switch tube 8 includes a control end that connects to an output of the pulse-width modulator 9, and the switch tube also connects to a primary coil of the step-up transformer 2. The under/over voltage protection circuit 10 samples the direct current supply 1 and outputs to the pulse-width modulator 9. The control protection module 14 further includes an open circuit and short circuit protection circuit 7 that connects to an input of the pulse-width modulator 9 and samples voltage from an output of the step-up transformer 2. The control protection module 14 may also include a ballast-track electric circuit 12 whose output connects to the input of the pulse-width modulator 9. The ballast-track electric circuit 12 samples voltage from the output of the step-up transformer 2 and samples current from the A/C converter 3. The HID lamp electronics controller 20 may further include a power supply instruction circuit 13 that connects to the output of the direct current supply 1. In an embodiment of the present invention, the HID lamp electronics controller 20 includes a first filtering network 11 positioned between the direct current supply 1 and the step-up transformer 2 and a second filtering network 11 positioned between the A/C converter 3 and CDI system 4.

Figure 2:
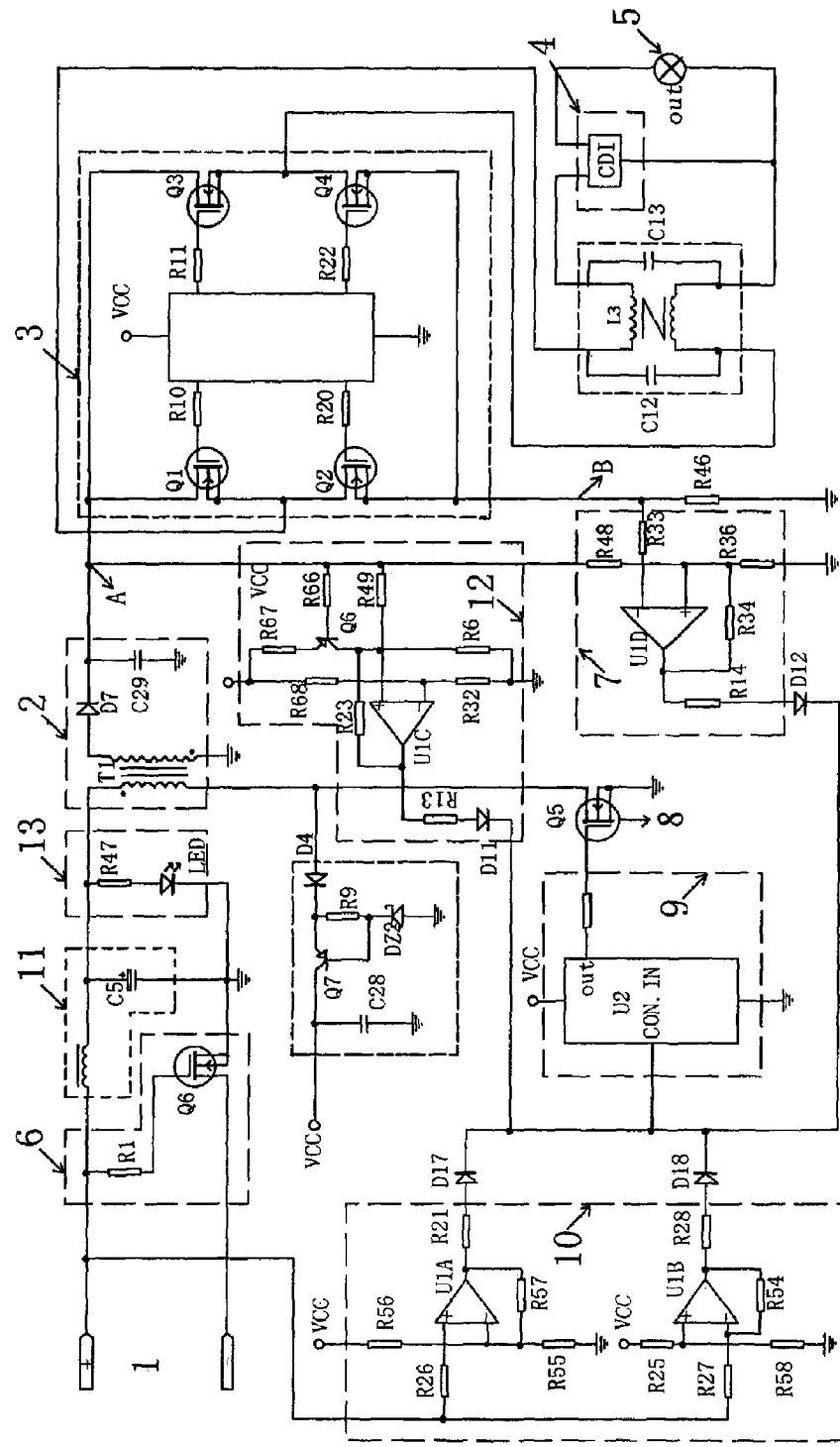
FIG. 2 is an electric circuit diagram of the HID lamp electronics controller according to a preferred embodiment of the present invention.

In a normal state, the direct current supply 1 provides a voltage to a grid of a field effect transistor (FET) through a resistance R1 so that a drain electrode conducts a source electrode. The current flows through the field effect transistor (FET). When an anode or a cathode of a battery is connected incorrectly, the reverse protection circuit 6 of the HID lamp electronics controller 20 positioned between the direct current supply 1 and the step-up transformer 2 causes the bias voltage of resistance R1 to be zero so that the current is restricted from flowing through the FET, as illustrated in FIG. 2. Since the current is restricted from flowing through the FET by the reverse protection circuit 6, the HID lamp electronics controller 20 is protected from burning if an anode or cathode of a battery is incorrectly connected.

The under/over voltage protection circuit 10 of the control protection module 14 includes two operational amplifiers, an inverting comparator amplifier and non-inverting comparator amplifier, to sample the voltage through a resistance R26 and a resistance R27, as illustrated in FIG. 2. The under/over voltage protection circuit 10 then outputs to the pulse-width modulator 9 through a first diode D17 and a second diode D18. Based on the output from the under/over voltage protection circuit 10, the pulse-width modulator 9 controls the opening and closing of the of the switch tube 8. When the voltage through the resistance R26 and the resistance R27 rises to 16V because of the decrease of the capacity of a battery, such as an automobile battery, the under/over voltage protection circuit 10 switches off so that the capacity of the battery is sufficient to start the engine of the automobile. Therefore, if a user forgets to turn off the lamp 5 of the HID lamp electronics controller 20 after turning off the engine of the automobile, the under/over voltage protection circuit 10 switches off to conserve a sufficient battery capacity to start the automobile.

The open circuit and short circuit protection circuit 7 of the control protection module 14 includes an operational amplifier U1C, which is a non-inverting voltage comparator amplifier. When an output circuit is open, the voltage of point A, shown on FIG. 2, will rise, and the operational amplifier UIC will output high voltage to the pulse-width modulator 9 through resistance R13 and diode D11. Accordingly, the pulse-width modulator 9 causes the switch tube 8 to close. When the output circuit is short, the voltage of point A is zero, and the operational amplifier UIC will output high voltage to the pulse-width modulator 9 through resistance R13 and D11, causing the switch tube 8 to close. The open circuit and short circuit protection circuit 7 will turn off the circuit when the circuit is open or short.

The ballast-track electric circuit 12 of the control protection module 14 includes an operational amplifier U1D that the ballast-track electric circuit uses to monitor electric voltage and current of point A and point B, as illustrated in FIG. 2. The ballast-track circuit 12 provides the monitored signal to the pulse-width modulator 9, causing the pulse-width of the modulator to change to stabilize the current. By causing the pulse-width of the pulse-width modulator 9 to change, the HID lamp electronics controller will work steadily as the lamp 5 ages or is replaced with brands having different parameters.

The power supply indication circuit 13 of the HID lamp electronics controller 20 causes a light emitting diode (LED) to light when there is current and causes the LED to turn off when there is no current in the circuit.

The invention claimed is:

1. A high intensity discharge (HID) lamp electronics controller for connection to a supply of direct-current power, the controller, comprising:
   step-up transformer operating in response to the power supply;
   an A/C converter receiving current from the step-up transformer;
   a capacitive-discharge ignition (CDI) system having an input receiving current from the A/C converter;
   an HID lamp, wherein the HID lamp connects to an output of the CDI system; and
   an electric reverse protection circuit, wherein the electric reverse protection circuit is provided between the direct-current power supply and the step-up transformer to prevent the CDI system from operating if the direct-current power supply is incorrectly connected to the controller.

2. A high intensity discharge (HID) lamp electronics controller for connection to a direct-current power supply, comprising:
   a step-up transformer receiving power from the power supply;
   an A/C converter responsive to current from the step-up transformer;
   a capacitive-discharge ignition (CDI) system;
   an HID lamp, wherein the HID lamp connects to an output of the CDI system;
   an electric reverse protection circuit, wherein the electric reverse protection circuit is provided between the direct-current power supply and the step-up transformer to prevent the CDI system from operating if the direct current power supply is incorrectly connected to the controller; and
   a protection control module, wherein the protection control module includes:
      a switch tube, wherein a primary coil of the step-up transformer connects to the switch tube;
      a pulse-width modulator, wherein a control extremity of the switch tube connects to an output of the pulse-width modulator; and
      an under-voltage and over-voltage electric protection circuit, wherein an input of the under-voltage and over-voltage electric protection circuit connects to an output of the direct current power supply and collects samples and wherein an output of the under-voltage and over-voltage electric protection circuit connects to an input of the pulse-width modulator.

3. The HID lamp electronics controller of claim 2, wherein the protection control module further comprises an open circuit and short circuit protection modulator, wherein an input of the open circuit and short circuit protection modulator connects to an output of the step-up transformer and collects samples, and wherein an output of the open circuit and short circuit protection module connects to the input of the pulse-width modulator.

4. The HID lamp electronics controller of claim 2, wherein the protection control module further comprises a ballast-track electric circuit, wherein an output of the ballast-track electric circuit connects to the input of the pulse-width modulator, and wherein the ballast-track electric circuit is operative to:
   sample from the output of step-up transformer; and
   sample from the A/C converter.

5. The HID lamp electronics controller of claim 1, further comprising at least two frequency filtering network systems, wherein one of the at least two frequency filtering network systems is provided between the direct current power supply and the step-up transformer, and wherein another of the at least two frequency filtering network system is provided between the A/C converter and the CID system.

6. The HID lamp electronics controller of claim 1, further comprising a power indication circuit, having an input connected to an output of the reverse protection circuit and operative to provide an indication corresponding to current flow through the reverse protection circuit.

* * * * *